Dec. 15, 1925.  1,565,315
D. J. DU PLESSIS
IMPLEMENT OR MACHINE FOR HARVESTING MAIZE
Filed June 9, 1920    2 Sheets-Sheet 1

Witness:
Arthur Thompson

Inventor:
Daniel Jacobus du Plessis.

Dec. 15, 1925.  
D. J. DU PLESSIS  
1,565,315  
IMPLEMENT OR MACHINE FOR HARVESTING MAIZE  
Filed June 9, 1920  
2 Sheets-Sheet 2

Witness:  
Arthur Thompson

Inventor:  
Daniel Jacobus du Plessis.

Patented Dec. 15, 1925.

1,565,315

UNITED STATES PATENT OFFICE.

DANIEL JACOBUS du PLESSIS, OF KOSTER, TRANSVAAL, SOUTH AFRICA, ASSIGNOR OF ONE-THIRD TO JOSEPH DEARLOVE HARDY VERSTER, OF KOSTER. TRANSVAAL, SOUTH AFRICA.

IMPLEMENT OR MACHINE FOR HARVESTING MAIZE.

Application filed June 9, 1920. Serial No. 387,736.

*To all whom it may concern:*

Be it known that I, DANIEL JACOBUS DU PLESSIS, a subject of the King of Great Britain, and resident of Koster, Transvaal Province, Union of South Africa, have invented certain new and useful Improvements in Implements or Machines for Harvesting Maize, of which the following is a specification.

This invention relates to a machine for harvesting maize; that is, for reaping or detaching the maize ears from the stalks of the plants and gathering or collecting the same.

In harvesting maize by mechanical means it is necessary for the grain ears to be snapped or broken off the stalks, and during this operation the plant is liable to be pulled bodily out of the ground; particularly is this the case in wet or loose or sandy soil. On the other hand, in the case of hard ground, the stalk is liable to be broken or torn, and so result in the whole or a large portion thereof being gathered or collected attached to the ear. The machine must be capable of picking the ears off single stalks or off several stalks, as when the plants stand in clusters or have sprouts. It is also necessary that the machine should detach the ears from any stalks that have fallen over or are inclined in any direction.

It is the object of this invention to construct a machine which will overcome these difficulties and possess the requisite attributes.

The improved machine can be adapted for harvesting simultaneously, one, two, three or more rows of the plants, as may be desired.

The machine comprises, for each row of plants, means in the form of a suitable roller, for engaging with and retaining or holding down the stalks of the plants during the time that the means which detach the ears are operating on the stalks. The roller is adapted also to serve the purpose of a road or transport wheel for the machine, and also to drive the ear-detaching means. The roller is positioned at such a distance at the rear of the front portion of the ear-detaching means that, if the stalk be a broken one, the engagement of the ear-detaching means with the ear or ears on the stalk will take place at such a distance in advance of the point at which the stalk is held on the ground by the roller, that only a very short portion of the stalk will be detached with the ear, and this will only occur in those few cases where the ear is very firmly connected with the stalk.

The means for detaching the ears consists of a pair of chains, the links or pivoted members of which are constructed or provided with outwardly extending fingers, blades or projections, by which the stalks are engaged and the ears detached. These chains, which preferably converge from the back to the front, may be driven by sprocket wheels, which may be combined with bevel wheels driven by other bevel wheels on a driving shaft.

The driving shaft may in turn be driven by sprocket wheels and a chain from the roller axle, through a suitable clutch. Means may be provided for maintaining the driving chain under suitable tension.

Members, preferably in the form of bars, are provided which serve as supports for the fingers or projections of the chains, during the time that they are operating on the stalks, and said bars are appropriately shaped to operate as guides for gradually deflecting the stalks from between the fingers or projections. These guides and supporting bars are preferably curved outwardly at the front, then converge, and then run parallel in the direction of the rear of the machine. Covers or guard members are preferably provided for protecting the chains, their sprockets and the driving means for the latter.

Under the rear portions of the chains, and at the rear of the guide and supporting bars, an inclined tray or plate is arranged, up which the detached ears are moved, preferably by the action of the chains.

At the back of the tray or plate a receptacle is provided to receive the ears.

Means are provided for raising and lowering the chains by moving them, together with their supporting frames, in order to regulate or adjust the height at which the chains operate at the front of the machine, and for temporarily lowering the front portions of the chains to engage inclined or fallen stalks.

The chains are suitably inclined downwardly from the back to the front of the machine, and at the front they may ordinarily work at a height of say six (6) to eight (8) inches above the ground level. Each finger which may be five (5) to six (6) inches (more or less) long, extends outwardly from its link in a substantially horizontal direction, and they may be so spaced that they are about an inch and a quarter (1¼") apart when in the parallel position, which is their normal relative position except when turning round the sprocket wheels.

The chains are adjusted so that the fingers of the two chains, at the front of the machine, are set a suitable distance, say about one half of an inch (½") apart, and means are preferably provided for varying this distance if desired.

In moving round the sprocket wheels the fingers open outwardly in the direction of their outer ends, and so serve to engage and deflect the stalks of the row of plants inwardly between the fingers or projections of the two co-operating chains. The stalks are pulled downwards between the fingers by the action of the roller as the machine advances, and the ears are detached by the action of the fingers, owing to the space between the fingers, when parallel, being less than the thickness of the ears. The fingers then operate as conveyors, and carry the ears to and move them up the inclined tray and over the upper rear end of the latter into the receptacle at the back of the machine. The opening of the fingers, as the chains pass round the back driving sprocket wheels, releases any ears that have been held or gripped between them, and delivers them on to the upper portion of the inclined tray, whence they pass into the receptacle at the rear.

The fingers may be formed with a sharpened back edge to cut any ears that might jamb too tightly between them, and so obviate putting any excessive strain on the fingers.

In the accompanying drawings there is illustrated, by way of example, a practical embodiment of the invention designed for taking the ears off the stalks of two parallel rows of maize plants.

In the drawings.

Figure 1:
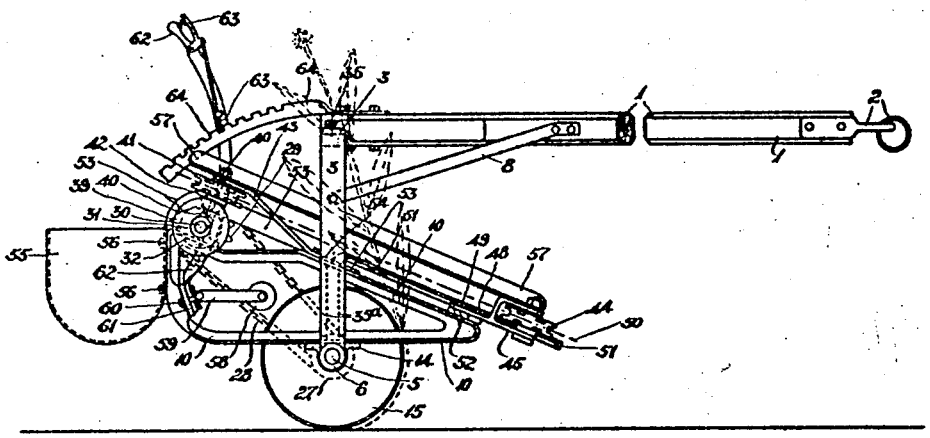
Fig. 1 is a side elevation of the machine, the ear-detaching chain seen in this view being represented by a dotted line, in order to render the driving means for the chain the more clear.

The machine, constructed as shown, is designed to be drawn by animal power, although it may be drawn by a tractor or any other form of mechanical power. For the purpose of attaching the animals to the machine a pole 1 is provided, which at the front is shown fitted with a shackle 2, or the like, for connecting to it the draught means, through which the power is applied.

With the arrangement shown, the animal power will preferably be connected to the machine in such a way that the animals can walk at the outside of each of the two rows of plants which are to be harvested.

The pole 1 at its rear end is carried by the members of the main frame, which are in the form of a bridle and consist of the two parts 3, 4, which are attached at their inner ends to the sides of the pole 1, and at their other ends loosely embrace the ends of a shaft 5. 6, 7, are collars, fixed on the ends of the shaft 5, for keeping the shaft in position in the main frame. 8, 9, are inclined stays for connecting the vertical portions of the parts 3, 4, to the pole 1, near its rear end.

10, 11, 12, 13 are four frames, which are arranged in two pairs and are provided on the underside with bearings 14, for mounting them on the shaft or axle 5. One pair of frames 10, 11, serves for carrying one pair of ear-detaching chains and their co-operating elements, and the other pair 12, 13, the other ear-detaching chains and their co-operating elements.

Figure 2:
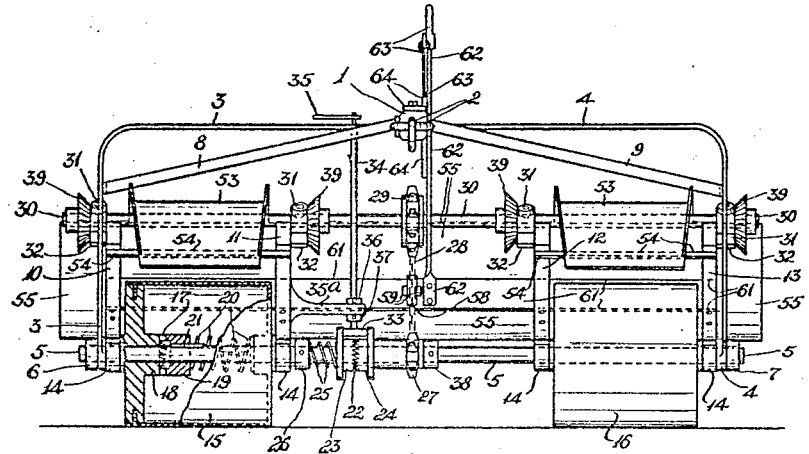
Fig. 2 is a front elevation of the machine, partly in section, with the ear-detaching chains and certain other parts removed.

On the shaft or axle 5, between each of the pairs of frames 10, 11, and 12, 13, there is mounted a suitable heavy roller, 15 and 16, which, by rolling over the plants, serves to hold down the stalks of the plants against the action of the ear-detaching chains. These rollers 15, 16, are each provided with a differential clutch 17, which is shown arranged inside the roller—see Fig. 2. The teeth of one part 18 of the clutch 17 are shown formed around a boss on the inside of the end plate of the roller, and the teeth on the other part 19 are held in engagement therewith by means of a spring 20. 21 is the feather or key for the movable part 19 of the clutch. These differential clutches 17 operate to drive the shaft or axle 5 from either or both of the rollers 15, 16, and at the same time, allow the rollers 15, 16, to move independently on the axle 5, to allow for the variation or difference in speed of the rollers 15, 16, when the machine is being turned.

For the purpose of driving the two pairs of ear-detaching chains from the shaft or axle 5, a clutch 22 is provided upon the axle 5, near its centre. This clutch 22 comprises the two toothed parts 23, 24, spring 25 and collar 26. The one part 24 of the clutch 22 is connected with a driving sprocket wheel 27, which, through the chain 28, and sprocket wheel 29, drives a shaft 30. This shaft 30 runs in four bearings 31, which are carried by brackets 32 fixed to the frames 10, 11, 12, 13. For operating the clutch 22, a cam 33 is provided, attached to one end of a rod or spindle 34, on the upper end of which an operating lever 35 is fixed. The spindle 34, at its upper end, works in a hole in the part 3 of the bridle, and near its other end engages in a bracket 35ª fixed to the frame 11. 36, 37 are two collars fixed on the spindle 34, above and below the bracket 35ª, respectively, to keep the spindle 34 and cam 33 in position between the halves of the clutch 22. 38 is a collar fixed on the axle 5 for preventing movement of the non-slidable part 24 of the clutch 22 along the axle, and maintaining the sprocket wheels 27 and 29 and chain 28 in alignment.

On the driving shaft 30 there are fixed four bevel wheels 39, one for driving each of the four ear-detaching chains.

As each pair of ear-detaching chains is constructed and arranged to co-operate in the same manner, it will suffice to describe one pair only, and, as the details of construction of each chain are similar, it will only be necessary to describe the construction of one chain.

Figures 5, 6:
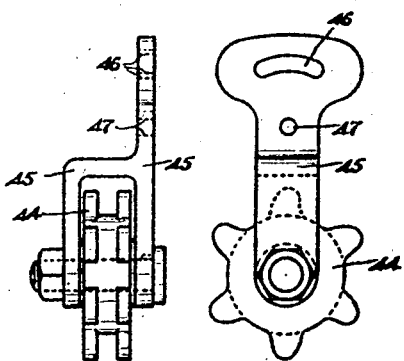
Figs. 5 and 6 are enlarged detail views at right angles, of one of the front sprocket wheels for the ear-detaching chains and its supporting bracket.
Figure 4:
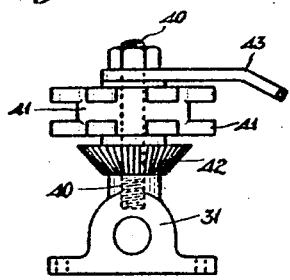
Fig. 4 is an enlarged detail view of one of the rear sprocked wheels for the ear-detaching chains, and its driving and supporting means.

For the purpose of driving each of the chains a pin or stud 40 is fixed in each of the bearings 31 of the driving shaft 30—see Fig. 4. On this pin 40 the chain-driving sprocket wheel 41 is loosely mounted. This sprocket wheel 41 is connected to a bevel pinion 42, which meshes with and is driven by the bevel wheel 39 on the shaft 30—see Fig. 1. The pin or stud 40, above the sprocket wheel 41, is supported by a stay 43, connecting it to the frame—see Figs. 1 and 4. The ear-detaching chains, at the front of the machine, pass round similar sprocket wheels 44, which are carried by adjustable brackets 45, fixed to the lower front portions of the frame—see Figs. 1, 5 and 6.

Figure 3:
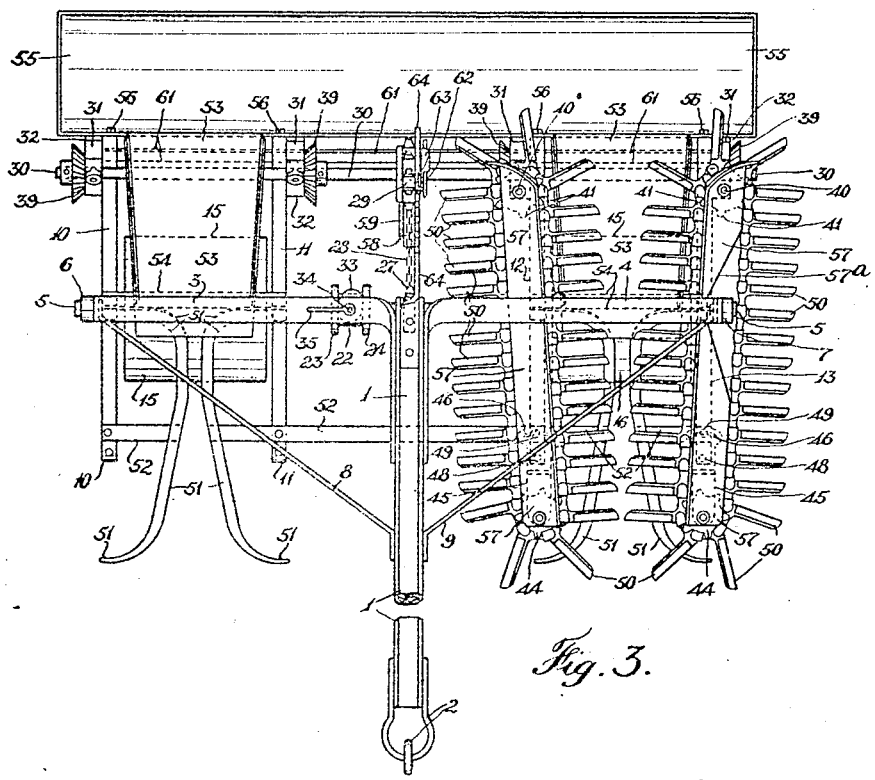
Fig. 3 is a plan view of the machine, one co-operating pair of the ear-detaching chains being shown and the other pair being removed.

As seen more particularly in Fig. 3, the distance between the centres of the sprocket wheels 44 for the front portions of each pair of co-operating chains, is somewhat less than the distance between the centres of the back driving sprockets 41, so that the chains of each pair diverge somewhat from the front to the back of the machine. The frames 10, 11, 12, 13, are shaped—see Fig. 1—so as suitably to incline the chains in a downward direction from the back to the front of the machine.

The brackets 45, which carry at the front of the machine, the sprocket wheels 44 for the chains, are preferably constructed so that the difference between their centres can be adjusted within certain limits. To provide for this, the bracket 45 is shown—see Fig. 6—constructed with a radial slot 46, at the rear of the hole 47, about which hole 47, the bracket 45 can be adjusted on the bolt 48, which pivotally secures it to the frame. 49 is a bolt, which engages in the radial slot 46, for bolting the bracket to the frame after adjustment. This construction allows the chains to be adjusted to vary the distance between the fingers of the two co-operating chains at the front of the machine.

Figure 8:
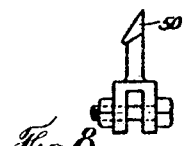
Figs. 7 and 8 are enlarged detail views of one of the fingers of the ear-detaching chains.
Figure 7:
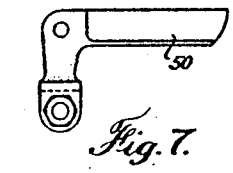

Each chain, as shown more particularly in Figs. 3, 7 and 8, consists of the requisite number of links, each link, as shown, being constructed in one piece with an outwardly extending finger or projection 50. These fingers or projections 50, as shown more particularly in Fig. 8, are preferably bevelled off to form a sharpened edge, which serves for cutting through any ears that might be gripped too tightly between the fingers 50, and which might tend to break the fingers if they were not cut.

The disposition of the chains of each co-operating pair relative to each other, and their arrangement in relation to their respective rollers 15 or 16, are clearly illustrated in Figs. 1 and 3. As seen in Fig. 3, each pair forms between its supporting frames a grid or grating which precludes the passage of the maize ears through it, and acts as a conveyor to carry the ears upwards, after they have been detached by the action of the fingers.

For the purpose of guiding or deflecting the stalks of the plants between the chains, or of assisting to do so, and, as the machine continues to advance, of moving the stalks from between the inner ends to the outer ends of the fingers, two rails 51 are provided for each pair of chains, one being arranged immediately beneath the front portion of each chain. These bars 51—see Fig. 3—are curved outwardly at the front and then converge towards the back. They run parallel to each other for a distance towards the back, where they are again bent outwardly and fixed to their respective frames. They are also shown supported by plates or bars 52, which are fixed to the front ends of the frames—see Fig. 3. These bars or rails 51 serve also to support the fingers 50, while they are operating to detach the ears from the stalks, and as they move from the front towards the back of the machine. The guiding and supporting bars or rails 51, and the fingers 50 of the chains, are so arranged that no opening is formed between them of a sufficient size to allow any ears of normal size to fall through. The distance between the ends of the fingers increases gradually from the front to the back of the machine, so that the stalks, when moved by the rails 51 into a position between the ends of the opposing fingers of the two chains, are able freely to pass down from between the chains as the advancing roller rolls them down.

Between each pair of frames, and at the rear of the rails 51, an inclined tray 53 is positioned. This tray 53, at the front lower end is supported by a cross number 54, which is arranged between and fixed to the frames, and at the upper rear edge is supported by the top edge of the receptacle 55, which latter is fixed to the back of all the four frames by the screws 56. The receptacle 55 receives all the ears which are detached and conveyed to and are pushed up the trays 53 by both pairs of chains. The receptacle 55, as shown, preferably extends for the full width of the back of the machine.

57 are suitably shaped guards, shown made of angle iron, one of which is secured to the centre pins of the sprocket wheels 41, 44 of each chain. The guards 57 for the two outer chains are cut away or shaped as indicated at 57ᵃ, to clear the inside of the parts 3, 4 of the bridle or main frame. The bottom portions of the guards 57 serve to protect the sprocket wheels 41, 44, and the driving gear co-operating therewith; and the inner vertical sides of said guards serve as retaining flanges and guides for the ears alongside the fingers of the chains.

If desired or found requisite, means may be provided for maintaining the driving chain 28 under suitable tension.

The arrangement represented in the drawing for this purpose consists of a suitable heavy roller 58, engaging with the inside of the chain 28,—see Fig. 1—a pair of links 59, which carry the spindle of the roller 58, and an eye-bolt 60, which pivotally connects the other ends of the links to a bar 61. The bar 61, which extends across the back of the machine, is secured to all the four frames 10, 11, 12, 13, for the purpose of giving the requisite stability to the structure carrying the ear-detaching chains and their driving means.

The adjustable means shown for placing the ear-detaching chains at the desired inclination to the ground, and for lowering the same at the front in order that they will engage any slanting or fallen stalks, consists of a lever 62, which at its lower end is fixed to the cross-bar 61. The lever 62 is provided with a spring catch 63, for co-operating with a quadrant 64, secured to the rear end of the pole 1. As will be understood, the chains may be adjusted or set at the desired inclination, as well as temporarily lowered, by releasing the catch 63 from the teeth of the quadrant 64 and moving the lever in the requisite direction; all the four frames, 10, 11, 12, 13, and the parts carried thereby, rotating on the main axle 5 during any such adjustment.

The rollers 15, 16, which serve for engaging and holding down the maize plants, serve also as the transport rollers. When they are used as transport rollers, then the clutch 22 is operated to disconnect from the main axle 5 the chain drive for shaft 30.

In the operation of the machine it will be understood that the fingers of the chains, which are splayed or opened out at the front as their carrying links pass round the front sprocket wheels, first engage with the stalks of the plants and move them in between the fingers of the pair of co-operating chains. Under the guidance of the guide bars the stalks are gradually moved towards the ends of the fingers. The roller is meantime engaging with the stalks at the ground level and holds them firmly and rolls over them, so that as the machine advances, the stalks are drawn down and the ears detached by the action of the fingers, which are spaced about enough to allow the stalks to pass between them but sufficiently close to retain the thicker ears. The ears are then transferred by the action of the chains conveying them up the tray and delivering them into the receptacle at the back. The guide bars operate to disengage the stalks from the fingers so that any ear on any particularly long stalk would be detached at the narrow parallel-sided portion of the opening formed between the inner portions of said guide bars, which opening is too narrow to allow any ordinary ear to pass through it.

What I claim as my invention, and desire to protect by Letters Patent is:—

1. An implement for harvesting maize, including a pair of co-operating chains, the links of which are provided with fingers which operate to detach the ears from the stalks of the plants, and a road wheel which serves as a roller for holding the stalks of the plants and drawing them down through the fingers of the co-operating chains.

2. An implement for harvesting maize, including a pair of co-operating chains the links of which are provided with fingers which operate to detach the ears from the stalks of the plants, a roller for holding the stalks of the plants and drawing them down through the fingers of the co-operating chains, an axle for said roller, and means for driving the ear-detaching chains from said axle.

3. An implement for harvesting maize, including a pair of co-operating chains the links of which are provided with fingers which operate to detach the ears from the stalks of the plants, a roller for holding the stalks of the plants and drawing them down through the fingers of the co-operating chains, an axle for said roller, and means for driving the ear-detaching chains from said axle, said driving means consisting of a chain, and sprocket wheels on the axle and on the driving shaft for the ear-detaching chains, a clutch, clutch operating means, and gearing for transmitting the motion from the shaft to the driving sprockets of the chains.

4. An implement for harvesting maize, including a plurality of pairs of co-operating chains, the links of each of which are provided with fingers which operate to detach the ears from the stalks of the plants, a road wheel for each pair of said chains, an axle for said road wheels, said road wheels serving as rollers to hold down the stalks of the plants while they are drawn through the ear-detaching chains.

5. An implement for harvesting maize, including a plurality of pairs of co-operating chains, the links of each of which are provided with fingers which operate to detach the ears from the stalks of the plants, a roller for each pair of said chains, and an axle for the rollers, said roller serving to hold down the stalks of the plants while they are drawn through the ear-detaching chains, and each of said rollers having a differential clutch, which clutches permit the rollers to move independently on their axle and allow for the difference in the speed of the rollers when the machine is being turned.

In testimony whereof I have signed my name to this specification.

DANIEL JACOBUS du PLESSIS.